United States Patent
Coyle et al.

(10) Patent No.: US 7,028,810 B2
(45) Date of Patent: Apr. 18, 2006

(54) METHOD FOR COOLING AN AXLE

(75) Inventors: Edward L. Coyle, Lakeland, FL (US); Donnell L. Dunn, Fargo, ND (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 10/761,554

(22) Filed: Jan. 21, 2004

(65) Prior Publication Data

US 2004/0149518 A1 Aug. 5, 2004

Related U.S. Application Data

(62) Division of application No. 10/288,664, filed on Nov. 5, 2002, now Pat. No. 6,871,726, which is a division of application No. 09/525,818, filed on Mar. 15, 2000, now Pat. No. 6,499,565.

(51) Int. Cl.
*F01M 5/00* (2006.01)

(52) U.S. Cl. .................. 184/6.12; 184/6.22; 74/606 A

(58) Field of Classification Search ............. 184/6.12, 184/6.22, 104.1; 74/606 A, 467; 475/160, 475/161, 230
See application file for complete search history.

(56) References Cited

U.S. PATENT DOCUMENTS

| | | | |
|---|---|---|---|
| 2,687,784 A * | 8/1954 | Klackner | ............... 184/104.1 |
| 3,736,812 A * | 6/1973 | Wellauer | ............... 74/606 A |
| 4,198,819 A | 4/1980 | Bourne | |
| 4,393,922 A | 7/1983 | Bahrle et al. | |
| 4,468,981 A | 9/1984 | Ries | |
| 4,633,938 A * | 1/1987 | Schunck et al. | ............... 165/47 |
| 5,316,106 A | 5/1994 | Baedke et al. | |
| 5,540,300 A | 7/1996 | Downs et al. | |
| 5,568,842 A | 10/1996 | Otani | |
| 5,622,051 A | 4/1997 | Iida et al. | |
| 5,678,461 A | 10/1997 | Stine | |
| 5,927,384 A | 7/1999 | Waldner, Jr. | |
| 5,931,218 A | 8/1999 | Carlson et al. | |
| 5,992,515 A | 11/1999 | Spiegel | |
| 6,036,615 A | 3/2000 | Young et al. | |
| 6,092,628 A | 7/2000 | Hinton et al. | |
| 6,155,135 A | 12/2000 | Gage et al. | |
| 6,401,870 B1 | 6/2002 | Roy et al. | |
| 6,499,565 B1 | 12/2002 | Coyle et al. | |
| 2003/0062223 A1 | 4/2003 | Coyne | |

OTHER PUBLICATIONS

U.S. Appl. No. 10/802,619, date unknown.

* cited by examiner

*Primary Examiner*—Chong H. Kim
(74) *Attorney, Agent, or Firm*—Stephen A. Bucchianeri; John Williams Stader; Michael G. Harms

(57) ABSTRACT

A work vehicle includes a frame and an axle assembly coupled to the frame. The axle assembly includes a first axle shaft and a first axle housing, with the first axle shaft disposed substantially within the first axle housing; a first wheel coupled to the first axle assembly; an axle lubricating fluid disposed within the first axle housing; and a first axle cooling device disposed within the first axle housing, in contact with at least a portion of the lubricating fluid, and including a first coil. Also disclosed is a method of cooling an axle assembly of a work vehicle. The method includes steps of removing heat from the lubricating fluid by placing the lubricating fluid in contact with the outer surface of a coil, and removing the heat from the inner surface of the coil by circulating the cooling fluid through the passage.

6 Claims, 2 Drawing Sheets

METHOD FOR COOLING AN AXLE

This application is a division of U.S. patent application Ser. No. 10/288,664, filed Nov. 5, 2002 now U.S. Pat. No. 6,871,726, which is a division of U.S. patent application Ser. No. 09/525,818, filed Mar. 15, 2000, now U.S. Pat. No. 6,499,565.

FIELD OF THE INVENTION

The present invention relates generally to the field of work vehicles. It relates more particularly to removal of braking heat from an axle of a wheeled loader.

BACKGROUND OF THE INVENTION

Some work vehicles, such as end loaders, must change their directions of movement frequently. To do this, wheel or live axle brakes are generally used to first bring the vehicle to a stop. When this is done frequently, the brakes become overheated.

This has sometimes been resolved by placing the brakes inside an axle housing, where the heat generated by brake friction is removed from the brake by an axle lubricating bath. The lubricant spreads the heat over the entire interior surface of the axle housing, whereupon thermal conduction through the walls of the axle housing heat the exterior surface of the axle housing and provide increased surface area for heat to be convected away by ambient air.

In some instances, however, convection to and from the axle housing surfaces is insufficient to remove braking heat rapidly enough, and the axle lubricant consequently becomes excessively hot (e.g., above 300 degrees Fahrenheit). This is injurious not only to the lubricant itself (accelerating oxidation and breakdown), but also to the bearings and seals associated with the axle shaft.

Typically, the brake is a wet multiple disk brake; "wet", because the disks rotate through a bath of lubricating oil. As the multiple brake disks rotate through the lubricating oil, braking heat is transferred from the disks to the lubricating oil.

The temperature of the lubricating oil consequently increases, and some of the heat within the lubricating oil is transferred to the axle shaft and to the axle housing. The axle shaft and axle housing are of limited size and mass and, hence, of limited heat capacity. Therefore, their temperatures begin to approach (under the duty cycle of frequent stops characteristic of a loader) the temperature of the lubricating oil because ambient air typically does not convect heat from the axle housing as rapidly as the brake convects heat into the lubricating oil. It is therefore necessary to actively cool the lubricating oil.

While one can add a cooling loop to an axle assembly and pump hot lubricating oil through a fan-cooled radiator, this is a costly and cumbersome approach. Further, it increases the number of opportunities for leakage or contamination of the lubricating oil in what is typically a dirty and dusty environment.

It would be advantageous to provide an apparatus and method of removing excessive heat from the axle lubricant, thereby cooling the axle assembly, without substantially increasing the risks of lubricant leakage and/or contamination.

SUMMARY OF THE INVENTION

One embodiment of the invention relates to a work vehicle including a frame and an axle assembly coupled to the frame. The axle assembly includes an axle shaft and an axle housing. The axle shaft is disposed substantially within the axle housing, and a wheel is coupled to the axle assembly. An axle lubricating fluid is disposed within the axle housing. An axle cooling device is also disposed within the axle housing, in contact with at least a portion of the lubricating fluid, and is configured as a coil including a plurality of elongate tubes.

Another embodiment of the invention relates to an axle assembly for a work vehicle. The axle assembly includes a first axle shaft and a first axle housing, and a second axle shaft and a second axle housing. The first and second axle shafts are disposed substantially within the first axle housing and the second axle housing, respectively. The second axle shaft and the second axle housing are disposed coaxial with, and in opposing relationship to, the first axle shaft and the first axle housing, respectively. This embodiment further includes a first cooling device disposed within the first axle housing, and a second cooling device disposed within the second axle housing. It further includes a differential gearset housing positioned intermediate the first and second axle housings and defining a chamber configured to receive a differential gearset. A differential gearset may also be included, and is disposed within the chamber and is rotatively coupled to the first and second axle shafts. Further included are a lubricating fluid disposed within the first and second axle housings. Still further included are a first axle cooling device including a first plurality of elongate tubes and disposed within the first axle housing, and a second axle cooling device including a second plurality of elongate tubes and disposed within the second axle housing.

Another embodiment of the invention relates to a method of cooling an axle assembly of a work vehicle. The axle assembly includes an axle shaft, an axle housing configured to substantially surround the axle shaft, a cooling coil housed within the axle housing and having a passage therethrough and outer and inner surfaces, a lubricating fluid disposed within the axle housing, and a cooling fluid disposed within the passage. The lubricating fluid is of a higher temperature than is the outer surface of the coil, and the outer surface of the coil is of a higher temperature than is the cooling fluid. The method includes a step of removing heat from the lubricating fluid by placing the lubricating fluid in contact with the outer surface of the coil. The method also includes a step of removing the heat from the inner surface of the coil by circulating the cooling fluid through the passage.

DETAILED DESCRIPTION OF THE PREFERRED EMBODIMENTS

Figure 1:
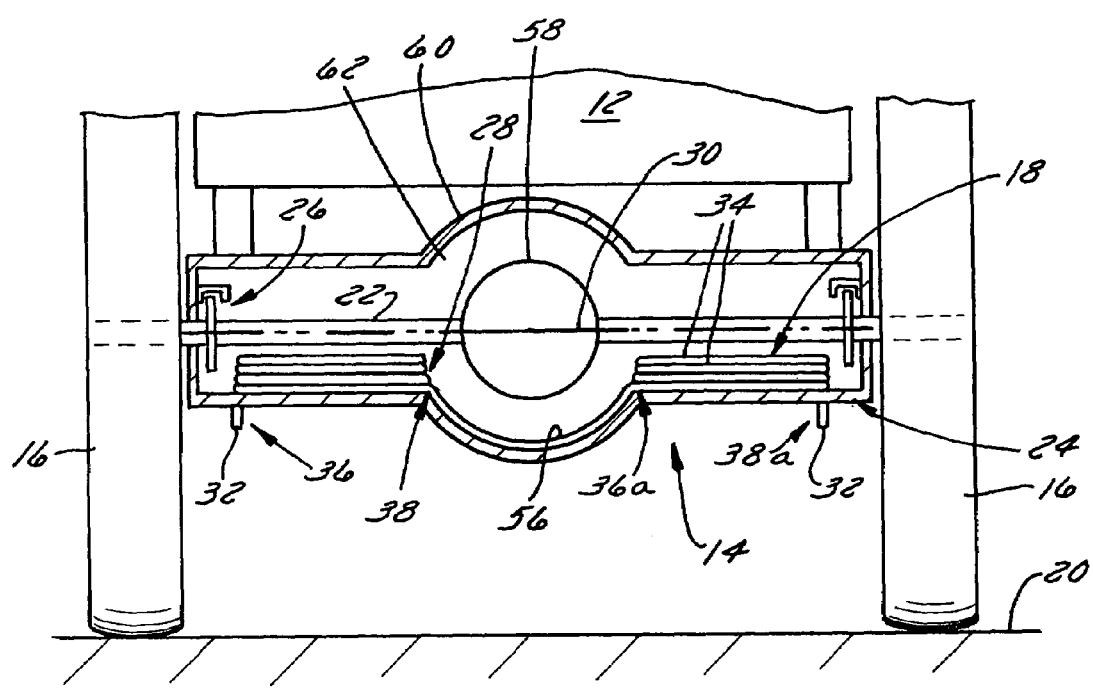
FIG. 1 is a rear sectional elevation of an axle assembly.

FIG. 1 shows a work vehicle 10 provided with a frame 12, an axle assembly 14, wheels 16, and an axle cooling apparatus 18. Frame 12 may be of any of the conventional types including fabricated steel or cast iron. Axle assembly 14 and axle cooling apparatus 18 are described below, and wheel 16 may be of any of the conventional types; e.g., rubber-tired, cleated, or tracked. Wheels 16 support axle assembly 14 with respect to a pavement or ground surface 20, and axle assembly 14 supports frame 12. Only one axle assembly 14 is shown, but work vehicle 10 may include any number of axle assemblies 14.

Axle assembly 14 includes at least one axle shaft 22 generally contained within an axle housing 24 and supported by axle housing 24 for rotative movement relative to axle housing 24. Axle shaft 22 is of conventional construction, typically machined of a medium-carbon steel and hardened at least in the regions of splines (not shown). Axle housing 24 is also generally of conventional construction (e.g., cast gray or ductile iron or fabricated of steel), but is of generally large transverse sectional size to accommodate a brake 26 and a cooling device, or coil 28 (both described below), as well as a planetary gearset (not shown). Axle housing 24 may be of any transverse sectional shape; e.g., round, square, etc.

Brake 26, shown schematically in FIG. 1 as a single disk braked by a caliper, is, in an exemplary embodiment, a wet multidisk brake of well-known and conventional design. The term "wet" refers to a bath of lubricating fluid 30 that at least partially immerses brake 26, lubricating fluid 30 thereby providing both lubrication and cooling of brake 26.

A cooling device, shown as a coil 28 and a portion of cooling system 18 (described below), is also housed within axle housing 24. Coil 28 is a tubular device having a passage 32 provided internally therethrough, is of generally conventional construction and is fabricated of a plurality of metal tubes 34, generally similar to a tube bundle of a shell-and-tube heat exchanger. In an exemplary embodiment, coil 28 is formed of a single length of tubing in one or more parallel "passes" by a series of 180 degree bends, providing a plurality of parallel tube lengths, each length connected to an adjacent length at one end so that the passes are disposed in series flow arrangement and coil 28 has one inlet 36 and one outlet 38. In an alternative embodiment (not shown), a coil is fabricated of a plurality of cut tube lengths joined to each other by "U"-shaped return bend fittings, themselves fabricated, if necessary, of a street elbow secured and sealed to a conventional elbow. In a further alternative embodiment, coil 28 includes fins, dimples, or is flattened to increase the surface area thereof in contact with lubricating fluid 30, and thereby to increase the heat transfer from lubricating fluid 30 to coil 28.

Coil 28 is disposed near an inner bottom surface of axle housing 24 to ensure its immersion in lubricating oil in various pitch and roll angles of work vehicle 10. In an exemplary embodiment, at least the lower portion of axle housing 24 is of a square transverse sectional shape so that coil 28 may be formed of a flat sectional shape. In an alternative embodiment, the transverse sectional shape of an axle housing is generally circular and the sectional shape of a coil is that of a segment of a circle having a slightly smaller radius than that of an inner surface of the axle housing.

Passage 32 within coil 28 is filled with a cooling fluid 40 (described below). If cooling fluid 40 is of a high pressure (e.g., greater than 80 pounds per square inch), coil 28 is preferably fashioned of a formable steel tube material and secured to fittings by welding or brazing. If cooling fluid 40 is of a lower pressure, coil 28 may advantageously be fashioned of a copper alloy (e.g., a soft brass) or an aluminum alloy for higher thermal conductivity and therefore a higher rate of heat transfer.

Cooling fluid 40 may be any fluid, liquid or gaseous, with sufficient heat capacity and flow rate to remove braking heat from coil 28. Since, however, most examples of work vehicle 10, such as a loader, are provided with hydraulic systems which include a hydraulic fluid generally maintained much lower than 300 degrees in temperature and otherwise suitable for removing heat from coil 28, in an exemplary embodiment work vehicle 10 uses hydraulic fluid obtained from an existing work vehicle hydraulic system as cooling fluid 40.

Figure 2:
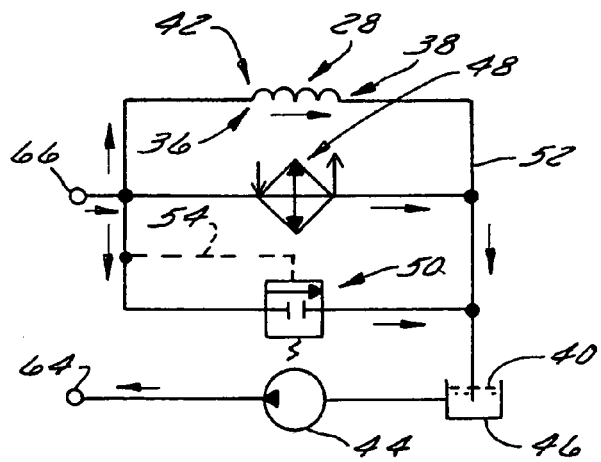
FIG. 2 is a schematic diagram of an embodiment of an axle cooling apparatus for cooling a single axle assembly.

In operation, lubricating oil 30 receives heat from brake 26. Oil 30 flows around coil 28. Coil 28 has outer and inner surfaces. Oil 30 has a higher temperature than the outer surface of coil 28, and the outer surface of coil 28 has a higher temperature than cooling fluid 40. This causes heat transfer from lubricating oil 30 to cooling fluid 40. Heat is removed from cooling fluid 40 as described below with respect to one of FIGS. 2–4. FIG. 2 is a schematic diagram of an axle cooling circuit 42 for an axle cooling apparatus 18 having one coil 28 for cooling of an axle assembly 14. Cooling apparatus 18 is a portion of a much larger and more complex hydraulic power circuit (not shown) connected at a cooling apparatus outlet port 64 and a cooling apparatus inlet port 66 for driving actuators (not shown; e.g., power steering and brakes, bucket and boom lift and tilt, etc.). Cooling apparatus 18 includes coil 28, a pump 44 (in an exemplary embodiment, an existing hydraulic system pump of work vehicle 10) drawing hydraulic fluid, used as cooling fluid 40, from an existing system reservoir 46; an existing heat exchanger 48, shown as an oil cooler; a control valve 50, shown as a back pressure regulating valve (BPRV), and appropriate fluid conduits 52 (e.g., pipe, tube, hose).

Pump 44, reservoir 46, heat exchanger 48, and conduits 52 may be fabricated from parts known to those of skill in the art. Coil 28 has been described above. Control valve 50 is typically a spring-and-diaphragm or spring-and-piston apparatus having a pilot line 54 in communication with the fluid whose pressure is to be controlled, fluid conducted by pilot line 54 applying pressure to the diaphragm or piston in opposition to the force exerted by the spring, which is disposed on an opposite side of the diaphragm or piston. A flow modulating device (e.g., a valve plug or poppet) is rigidly secured to the center of the diaphragm or the poppet, so that it moves in unison with the center of the diaphragm or the poppet in correspondence with the pressure of the fluid and the spring rate of the spring. In an exemplary embodiment, control valve 50 is part number 4097 manufactured by Shoemaker Inc., 12120 Yellow River Road, Fort Wayne, Ind. 46818 USA.

In an exemplary embodiment, heat exchanger 48 and coil 28 are fluidly disposed in parallel with control valve 50. In this way, a small pressure drop (e.g., 50 pounds per square inch) may be imposed by control valve 50 to direct cooling fluid 40 through heat exchanger 48 and coil 28 without substantially decreasing the efficiency of the work vehicle hydraulic system.

Figure 3:
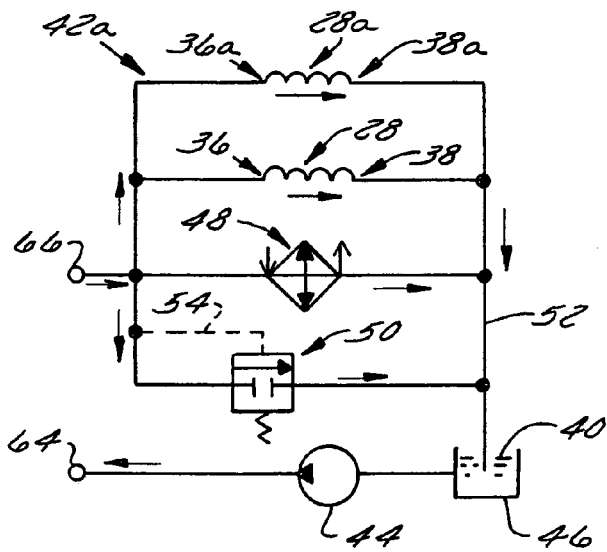
FIG. 3 is a schematic diagram of an embodiment of an axle cooling apparatus for cooling two axle assemblies.

FIG. 3 is a schematic diagram of a cooling circuit 42a for use with a cooling apparatus of a work vehicle, the work vehicle further comprising a second axle assembly, generally similar to first axle assembly 14 described above. The second axle assembly is disposed coaxial with and in opposing relationship to the first axle assembly. In the embodiment shown in FIG. 1, the first axle assembly is the portion of axle 22 to the left of differential gearset 58, and the second axle assembly is the portion of axle 22 to the right of differential gearset 58.

Cooling circuit 42a includes a second coil 28a, generally similar to first coil 28 described above. Second coil 28a is fluidly disposed in parallel flow relationship to first coil 28. Inlet port 36 of first coil 28 is in fluid communication with inlet port 36a of second coil 28a, and outlet port 38 of first coil 28 is in fluid communication with outlet port 38a of second coil 28a. This provides a large flow area, and hence a high flow rate of cooling fluid through first coil 28 and second coil 28a, allowing a high heat transfer rate with a relatively small and inexpensive first coil 28 and second coil 28a.

Figure 4:
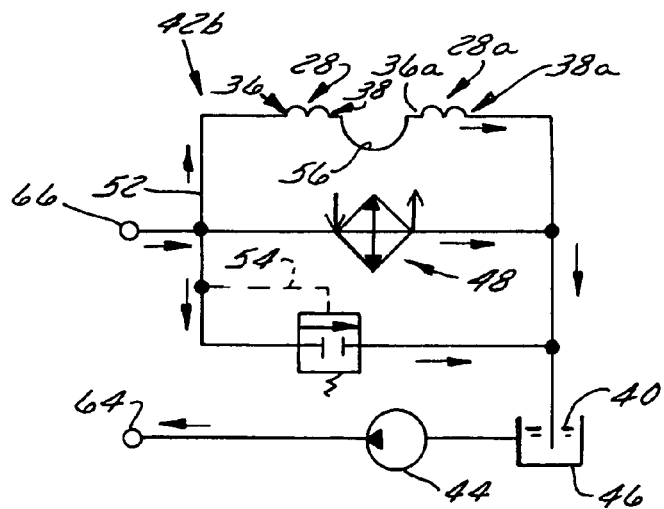
FIG. 4 is a schematic diagram of an alternative embodiment of an axle cooling apparatus for cooling two axle assemblies.

FIG. 4 is a schematic diagram of a cooling circuit 42b for use with a cooling apparatus of a work vehicle, the work vehicle further comprising a second axle assembly generally similar to first axle assembly 14 described above. The cooling apparatus is similar to the cooling apparatus described above with reference to FIG. 3. In this embodiment, second coil 28a is fluidly disposed in series flow relationship to first coil 28 by use of a connector, shown as a crossover conduit 56. Outlet port 38 of first coil 28 delivers cooling fluid 40 to inlet port 36a of second coil 28. This configuration provides a greater length of time for any given particle of cooling fluid 40 to absorb heat from coils 28 and 28a at a relatively low flow rate, providing a relatively large efficiency of cooling in terms of the quantity of thermal units transferred per unit of cooling fluid volume.

In any embodiment of axle assembly 14, first axle shaft 22 and a second axle shaft may be connected to opposite sides of a differential gearset 58 (shown in FIG. 1). Generally, a differential housing 60, configured to include a chamber 62 to accommodate differential gearset 58, is then provided to support and shield differential gearset 58 and to contain a lubricant for differential gearset 58. Typically, this lubricant will be similar to lubricating fluid 30, and one common bath of lubricating fluid 30 may be used for lubrication of differential gearset 58 as well as for lubrication and cooling of other parts of axle assembly 14. Crossover conduit 56 may then be given the bowed shape shown in FIG. 1 in order to not interfere with differential gearset 58.

It will be understood that the foregoing description is of exemplary embodiments of the invention, and that the invention is not limited to the specific forms shown. Other modifications may be made in the design and arrangement of other elements without departing from the scope and spirit of the invention as expressed in the appended claims.

What is claimed is:

1. A method of cooling an axle assembly of a work vehicle, wherein the axle assembly includes an axle shaft, an axle housing configured to substantially surround the axle shaft, a cooling coil housed within the axle housing and having a passage therethrough outer and inner surfaces, the axle assembly further including a second cooling coil, wherein the cooling coil is disposed in a left axle housing and the second cooling coil is disposed in a right axle housing, a lubricating fluid disposed within the axle housing, and a cooling fluid disposed within the passage, and further wherein the lubricating fluid is of a higher temperature than is the outer surface of the coil and the outer surface of the coil is of a higher temperature than is the cooling fluid, the method comprising steps of:

removing heat from the lubricating fluid by placing the lubricating fluid in contact with the outer surface of the coil wherein the outer surface of the coil is disposed between a brake assembly and a differential gearset, the coil being entirely disposed underneath the axle shaft;

removing the heat from the inner surface of the coil by circulating the cooling fluid through the passage;

removing heat from the lubricating fluid by placing the lubricating fluid in contact with the outer surface of the second coil;

directing flow of cooling fluid to the coil by using a back pressure regulating valve to impose a pressure difference across the coil; and removing the heat from the cooling fluid by circulating the cooling fluid through a heat exchanger.

2. The method of 1, wherein the axle assembly includes a second cooling coil, and wherein the cooling coil is disposed in a left axle housing and the second cooling coil is disposed in a right axle housing, and wherein the method further comprises the step of:

removing heat from the lubricating fluid by placing the lubricating fluid in contact with the outer surface of the second coil.

3. A method of cooling an axle assembly of a work vehicle, wherein the axle assembly includes an axle shaft, an axle housing configured to substantially surround the axle shaft, a cooling coil housed within the axle housing and having a passage therethrough outer and inner surfaces, the axle assembly further including a second cooling coil, wherein the cooling coil is disposed in a left axle housing and the second cooling coil is disposed in a right axle housing, a lubricating fluid disposed within the axle housing, and a cooling fluid disposed within the passage, and further wherein the lubricating fluid is of a higher temperature than is the outer surface of the coil and the outer surface of the coil is of a higher temperature than is the cooling fluid, the method comprising steps of:

removing heat from the lubricating fluid by placing the lubricating fluid in contact with the outer surface of the second coil;

removing heat from the lubricating fluid by placing the lubricating fluid in contact with the outer surface of the coil wherein the outer surface of the coil is disposed in one of a left axle housing and a right axle housing and the coil is disposed entirely underneath the axle shaft; and removing the heat from the inner surface of the coil by circulating the cooling fluid through the passage.

4. The method of 3, wherein the axle assembly includes a second cooling coil, and wherein the cooling coil is disposed in a left axle housing and the second cooling coil is disposed in a right axle housing, and wherein the method further comprises the step of:

removing heat from the lubricating fluid by placing the lubricating fluid in contact with the outer surface of the second coil.

5. A method of cooling an axle assembly of a work vehicle, wherein the axle assembly includes an axle shaft, an axle housing configured to substantially surround the axle shaft, a cooling coil housed within the axle housing and having a passage therethrough outer and inner surfaces, the axle assembly further including a second cooling coil, wherein the cooling coil is disposed in a left axle housing and the second cooling coil is disposed in a right axle housing, a lubricating fluid disposed within the axle housing, and a cooling fluid disposed within the passage, and further wherein the lubricating fluid is of a higher temperature than is the outer surface of the coil and the outer surface of the coil is of a higher temperature than is the cooling fluid, the method comprising steps of:

transmitting heat from a wet multiple disk brake disposed in the axle housing to the lubricating fluid;

removing heat from the lubricating fluid by placing the lubricating fluid in contact with the outer surface of the second coil;

removing heat from the lubricating fluid by placing the lubricating fluid in contact with the outer surface of the coil, the outer surface of the coil being disposed between a brake assembly and a differential gearset and where the coil is disposed entirely underneath the axle shaft; and removing the heat from the inner surface of the coil by circulating the cooling fluid through the passage.

6. The method of 5, wherein the axle assembly includes a second cooling coil, and wherein the cooling coil is disposed in a left axle housing and the second cooling coil is disposed in a right axle housing, and wherein the method further comprises the steps of:

removing heat from the lubricating fluid by placing the lubricating fluid in contact with the outer surface of the second coil.

\* \* \* \* \*